United States Patent [19]
King et al.

[11] Patent Number: 6,014,702
[45] Date of Patent: Jan. 11, 2000

[54] HOST INFORMATION ACCESS VIA DISTRIBUTED PROGRAMMED OBJECTS

[75] Inventors: Thomas F. King, Wake Forest; Gregory Thomas Knowles, Raleigh; Raymond Steven Rittenhouse, Cary; Yih-Shin Tan, Raleigh, all of N.C.

[73] Assignee: International Business Machines Corporation, Armonk, N.Y.

[21] Appl. No.: 08/868,873

[22] Filed: Jun. 4, 1997

[51] Int. Cl.[7] .................................................. G06F 15/16
[52] U.S. Cl. ........................ 709/227; 709/217; 709/229
[58] Field of Search ..................... 395/200.31, 200.33, 395/200.59, 200.97, 200.57, 200.55, 200.79, 500, 560; 709/201, 203, 217, 219, 225, 229

[56] References Cited

U.S. PATENT DOCUMENTS

| | | | |
|---|---|---|---|
| 5,325,361 | 6/1994 | Lederer et al. | 370/94.1 |
| 5,390,314 | 2/1995 | Swanson | 395/500 |
| 5,604,896 | 2/1997 | Duxbury et al. | 395/500 |
| 5,734,871 | 3/1998 | Kleinerman et al. | 395/500 |
| 5,754,830 | 5/1998 | Butts et al. | 395/500 |
| 5,768,511 | 6/1998 | Galvin et al. | 395/200.33 |
| 5,801,679 | 9/1998 | McCain | 345/145 |

OTHER PUBLICATIONS

Distributed Power Builder 6.0—Shared Objects http://techinfo.sybase.com/css/techinfo.nsf/DocId/ID=47716, Dec. 1, 1997.

*Primary Examiner*—Mehmet B. Geckil
*Attorney, Agent, or Firm*—Jeanine S. Ray-Yarletts

[57] ABSTRACT

A method and apparatus for developing persistent, single implementation host access applications deployable across multiple platforms. The interaction between host and clients is accomplished directly without platform-specific server function and with data-stream, versus screen, manipulation of host information.

36 Claims, 5 Drawing Sheets

HOST INFORMATION ACCESS VIA DISTRIBUTED PROGRAMMED OBJECTS

FIELD OF THE INVENTION

The present invention relates to a computer system, and to a method of operating such a computer system attached to a network, such that the computer system can access data and code over the network. It specifically relates to development of client applications which access and process information stored on a host computer using distributed application technologies.

RELATED APPLICATIONS

Application Ser. No. 08/868,611 entitled Applet Redirection for Controlled Access to Non-originating Hosts filed on Jun. 4, 1997 and assigned to International Business Machines, Inc.

BACKGROUND OF THE INVENTION

In the past couple of years there has been an explosive growth in the Internet, and in particular of the World-wide Web (WWW or Web), which is one of the facilities provided on top of the Internet. The WWW comprises many pages or files of information, distributed across many different servers. Each page is identified by a Universal Resource Locator (URL). The URL denotes both the server machine, and the particular file or page on that machine. There may be many pages or URLs resident on a single server.

In order to use the WWW, a client runs a piece of software known as a Web browser, such as WebExplorer (provided as part of the Operating System/2 (OS/2)© IBM Corporation), or the Navigator (©) program available from Netscape Communications Corporation. The client interacts with the browser to select a particular URL, which in turn causes the browser to send a request for that URL or page to the server identified in the URL. Typically the server responds to the request by retrieving the requested page, and transmitting the data for that page back to the requesting client (the client server interaction is performed in accordance with the hypertext transport protocol ("HTTP")). This page is then displayed to the user on the client screen. The client may also cause the server to launch an application, for example to search for WWW pages relating to particular topics.

Most WWW pages are formatted in accordance with a language known as HTML (hypertext mark-up language). Thus a typical page includes text together with embedded formatting commands, referred to as tags, which can be used to control the font size, the font style (for example, whether italic or bold), how to lay-out the text, and other page options. A Web browser parses the HTML script in order to display the text in accordance with the specified format. In addition, an HTML page can also contain a reference, in terms of another URL, to a piece of multimedia data, for example, an image, a video segment, or an audio file. A Web browser responds to such a reference by retrieving and displaying or playing the data. Alternatively, such multimedia data may form its own WWW page, without any surrounding HTML text.

Most WWW pages also contain one or more references to other WWW pages, which need not be on the same server as the original page. Such references may generally be activated by the user selecting particular locations on the screen, typically by (double) clicking a mouse control button. These references or locations are known as hyperlinks, and are typically flagged by the browser in a particular manner (for example, any text associated with a hyperlink may be in a different color). If a user selects the hyperlink, then the referenced page is retrieved and replaces the currently displayed page.

Further information about HTML and the WWW can be found in "World Wide Web and HTML" by Douglas McArthur, p18–26 in Dr Dobbs Journal, December 1994, and in "The HTML SourceBook" by Ian Graham, (John Wiley, New York, 1995).

As so far described, and broadly speaking as currently implemented, the WWW suffers from the disadvantage that pages downloaded from a server to a client are essentially passive, in other words, they do not contain code which is executed at the client machine. One implication of this is that the server cannot offload onto the client any of the processing associated with the interaction between the client and the server. Thus if the client is completing a form with their telephone number for example, then any formal checks such as to the number of digits in the telephone number must be performed at the server. This results firstly in a heavier processing burden at the server, and secondly in time-consuming extra communications between the server and client should there be any mistakes to correct. Moreover, the inability of the server to download code for execution at the client is a significant limitation on the type of applications that can be created to exploit the WWW.

Recent developments, based particularly on the Java (© Sun Microsystems, Inc.) technology from Sun Microsystems Inc., have sought to overcome the above difficulties. The Java technology comprises primarily (i) a new programming language, somewhat similar to C and C++, and (ii) a virtual machine. Essentially, programs written in the Java programming language can be compiled into byte code form, and then interpreted at runtime on the Java virtual machine executing on the client. The Java virtual machine converts the byte codes into instructions that can be executed by the underlying physical machine.

Programs written using Java can be downloaded over the WWW in the form of byte codes for execution on a Java virtual machine at the client. Such programs are known as "applets". The use of the Java technology for downloading code over the WWW has two major benefits. Firstly, an applet can be platform independent, if we assume that each client has a copy of the Java virtual machine (the virtual machine at the client's system is typically incorporated either into the operating system, or into the Web browser itself). In other words, there is no need for a server to have different versions of the code for downloading to clients according to their respective operating systems and machines. Therefore, only a single version of the relevant code needs to be written and maintained, which makes life much simpler for software developers.

Secondly, because the applet executes on a virtual machine, rather than a physical machine, security is greatly improved. Thus, when downloading code over the network, there is always a risk that it will include some malicious code (accidentally or otherwise) that may damage data or programs stored at the client. The virtual machine however can monitor the operation of the applet, and so detect and prevent such malicious activity.

It will be noted that the concept of downloading software from a server to a client in the form of byte codes for execution on a virtual machine was also known independently of the Java technology, see for example U.S. Pat. No. 5,347,632.

In order to invoke a Java applet, a Web page of HTML text contains an <APPLET> tag, which identifies the URL containing the applet. A browser responds to this tag by retrieving and running the applet. Also defined is a <PARAM> tag, which is contained within a pair of corresponding <APPLET> and </APPLET> tags, and which can be used to specify parameters that are passed to the applet at run-time. (Note that the APPLET and PARAM tags are not formally incorporated into the HTML standard, but are nevertheless recognised by many Web browsers). Further information about the Java technology and applets can be found in "Teach Yourself Java in 21 Days" by Laura Lemay and Charles Perkins (Sams.net Publishing, Indianapolis, USA, 1996).

Prior to and in parallel to the WWW advancements described above, separate technologies were being developed to allow workstation access to mainframe data. One such technology which is prevalent in business environments today is terminal emulation (emulator) software which resides on user PCs and provides connectivity to host computers via a variety of networking protocols (e.g. SNA, TCP/IP, etc.). When executed, emulators present an application window similar to early textual mainframe-specific data-stream terminals (e.g. 3270/5250/VT) that allow a user to execute applications residing on the host. Electronic mail is an example of such an application whereby the host stores incoming messages for a user that they can access remotely via an emulator.

Emulators, through the development of Emulator High-Level Language Application Programming Interfaces (EHLLAPI), have become programmable to allow developers to customise their access and manipulation of host data. The programmed interface runs on top of the emulation software on the local workstation, simulates keystrokes against the emulator screen, and copies data to and from it (screen scraping). Because emulators simply relayed text-based output of mainframe applications, EHLLAPI applications were developed that could gather that information and display it in more useable and appealing graphical user interfaces (GUIs). Some implementations also do more than screen scraping and actually manipulate data-streams before they are formatted for screen output. These capabilities are valuable to emulator users who automate repetitive tasks, mask host applications and integrate host information with workstation software. An example of such an EHLLAPI application is a point-and-click front-end GUI that allows users to search a host database that has difficult textual command sequences. The EHLLAPI application can receive input from the user in the form of windowed checkboxes or drop-down list selections and translate that into the textual commands necessary to execute the database query. The results of the query can also be formatted to present the user with a more user-friendly list of results.

The basic Java and emulator functions described above have recently been combined to yield host connectivity without emulator software residing on the user's workstation. Instead, Java emulator applets have been developed that physically reside on a server machine and provide emulator function when accessed via a Java-enabled browser. With this approach, and the proliferation of browsers on user desktops, there is no longer a need to maintain emulator code on each individual machine and client platform. However, the complexity of emulator function and difficulties of maintaining persistent data in Java implementations have limited the capabilities of these Web emulator solutions.

Two key problems that have not been resolved for Web emulators are server platform independence and data-stream access. Current solutions create server platform dependence by using Java to merely extend the display of an emulator application running on the server. Thus, the Java applet must know how the server emulator displays information to parse it properly. With such an approach the solution depends upon running particular server software and loses some independence benefits of Java. In addition, such approaches are limited to screen scraping when interacting with the host. This requires that application developers know the screen format and the sequence of keystrokes necessary to manipulate it. No current Web emulator implementation allows complete server and client platform independence while also providing data-stream access to emulator application developers.

SUMMARY OF THE INVENTION

The present invention provides a method and apparatus allowing programming capability for platform independent host information access solutions to be developed once and deployed across multiple platforms while also providing pre-display data-stream access to incoming information. These capabilities are possible because the present invention implements the core host access function in a complete class model that is separable from other components (e.g. server platform) and only requires, in the preferred embodiment, a Java-enabled browser to operate; although the present invention is not limited to Java technology and is applicable to any dynamically downloadable programming environment.

With the present invention, application developers can write Java applets that manipulate data from the conventional data-stream presentation space (such as 3270/5250/VT) without requiring the users to have the applets residing on their machines. The presentation space represents an imaginary terminal screen which contains both data and associated attributes host applications send or receive from the display. The applets can open a session to the host, wait for incoming host data, get specific strings from the imaginary screen, get associated attributes of the strings, set new string values for a specific location, send data-stream function keys back to the host and wait for the next host response. After an interaction is complete, the applet can switch to other tasks or simply close the session. The entire operation can be done without ever showing host screens. Of particular benefit, the applets only reside on the server which the user accesses and need not reside on each user's workstation. Such a solution provides significant maintenance and resource savings.

The present invention is an improvement on client-specific, screen scraping EHLLAPI in several ways. The major difference is that it operates directly on the data-stream while EHLLAPI operates on the traditional emulator screen created using the data-stream. Thus, a significant layer of overhead is reduced. It also does not require emulator software running on the local workstation. In addition, its Java classes and methods are no different than other Java classes, thus reducing programmers' dependencies on knowing the emulator's specific screen format and keyboard layout. Further more, the present invention is platform independent and downloadable to execute on the client computer using technology such as Java.

DETAILED DESCRIPTION OF THE PREFFERED EMBODIMENT

Figure 1:
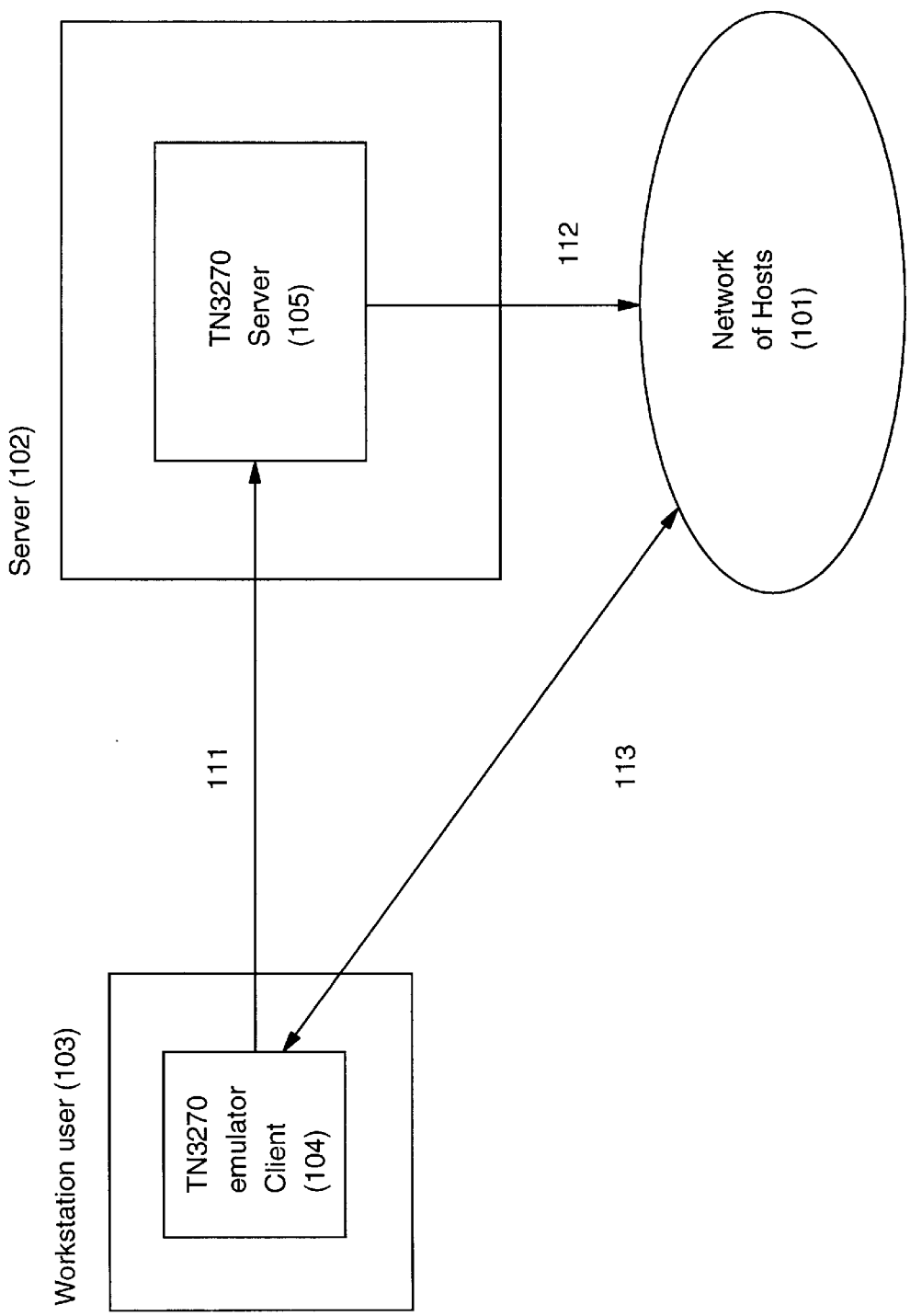
FIG. 1 depicts a basic network environment with standalone client emulators (Prior Art).

The preferred embodiment of the present invention incorporates many functions that an application developer can use in manipulating host information as detailed below. The 3270 emulation function and Java environment are used as examples in the preferred embodiment but are not meant to limit the invention in any way to a particular programming environment or emulation environment.

1) Session Initiation and Termination—The present invention provides methods for session initiation and termination without the need for separate function calls to start an emulator session. The session creation method establishes a host connection automatically and creates a presentation space which holds the information for the applet to interact with.

2) Field Operations—The fundamental element of a host presentation space is the field. A field includes both contents and attributes. The present invention provides methods for programs to navigate through multiple fields, obtain field attributes and manipulate contents of the fields. For example, a user program can go through all of the input fields of the current presentation space by obtaining the first unprotected field and then sequentially looping through the following unprotected fields and modifying the unprotected field values to input provided by the user. There are methods for navigating several types of fields, in both forward and backward directions. These methods require no understanding of keyboard keystrokes typically needed for EHLLAPI programs.

3) Block Operations—The entire content of the presentation space is available for copying to and from workstation programs. A typical use is for a word processor program to integrate a screen full of host information at one time. The operations will also allow partial ranges of the presentation space to be copied as blocks. Another useful example is for a program to check for the appearance of certain strings in the presentation space before the next action is taken. The present invention provides several methods to allow programs to wait for a pattern to show before proceeding.

4) Key Operations—There are two categories of key operations related to a traditional host screen, such as 3270. The first are those defined in the 3270 data-stream architecture for use by terminal users to interact directly with the host applications. These include Enter, Clear, System Request, PA and PF keys. Screens sent down by the host applications often list them as function keys for display by a GUI. The present invention provides methods for applets to respond to host applications with these function keys. The second category contains 3270 keys defined to help terminal operators productivity, such as the tab keys, which do not interact with the host applications. Some of these keys are useful in EHLLAPI programming but not for the present invention because of the availability of field and block operations. Since the focus of the present invention is host interactions, rather than screen, there is no need to include keys of this category.

5) Visual Control—The majority of workstation programs that will use the present invention are likely to provide their own GUI, in which case, a session can be established without any visual element associated with it. The present invention defines a default class that represents the applet with a 3270 screen GUI provided, but its visibility can be controlled programmatically via show and hide methods.

With these functions and the portability enhancements available with the present invention, developers are able to create host access applications with greater functionality and deployability than those previously possible. This becomes much more evident through specific examples.

The network configuration shown in FIG. 1 represents the typical emulator user's environment before the introduction of Web accessibility into emulator solutions. A user at workstation 103 wishes to connect to their host computer in order to access a database or electronic mail. To do this they use a TN3270 emulator client (104) executing on the user's workstation (103) to reach the host. This client communicates (111) with a TN3270 server (105) residing on a host server (102). The host server relays the client request (112) to the network of hosts (101) where it eventually reaches the host requested by the user. Data is then transmitted from the host to client 104 such as the text of a logon screen.

After logging on the user has a persistent end-to-end session with the host (113) over which they can use applications on the host for functions such as database queries or reading electronic mail. Although TN3270 clients and servers are used to describe the typical emulator environment, such specification is not meant to limit the invention in any way to a particular programming or emulation environment.

Of particular importance, the typical environment as displayed in FIG. 1 requires that client software physically reside on workstation 103. This poses resource constraint and maintenance difficulties when having to manage many applications across many user workstations and platforms.

Figure 2:
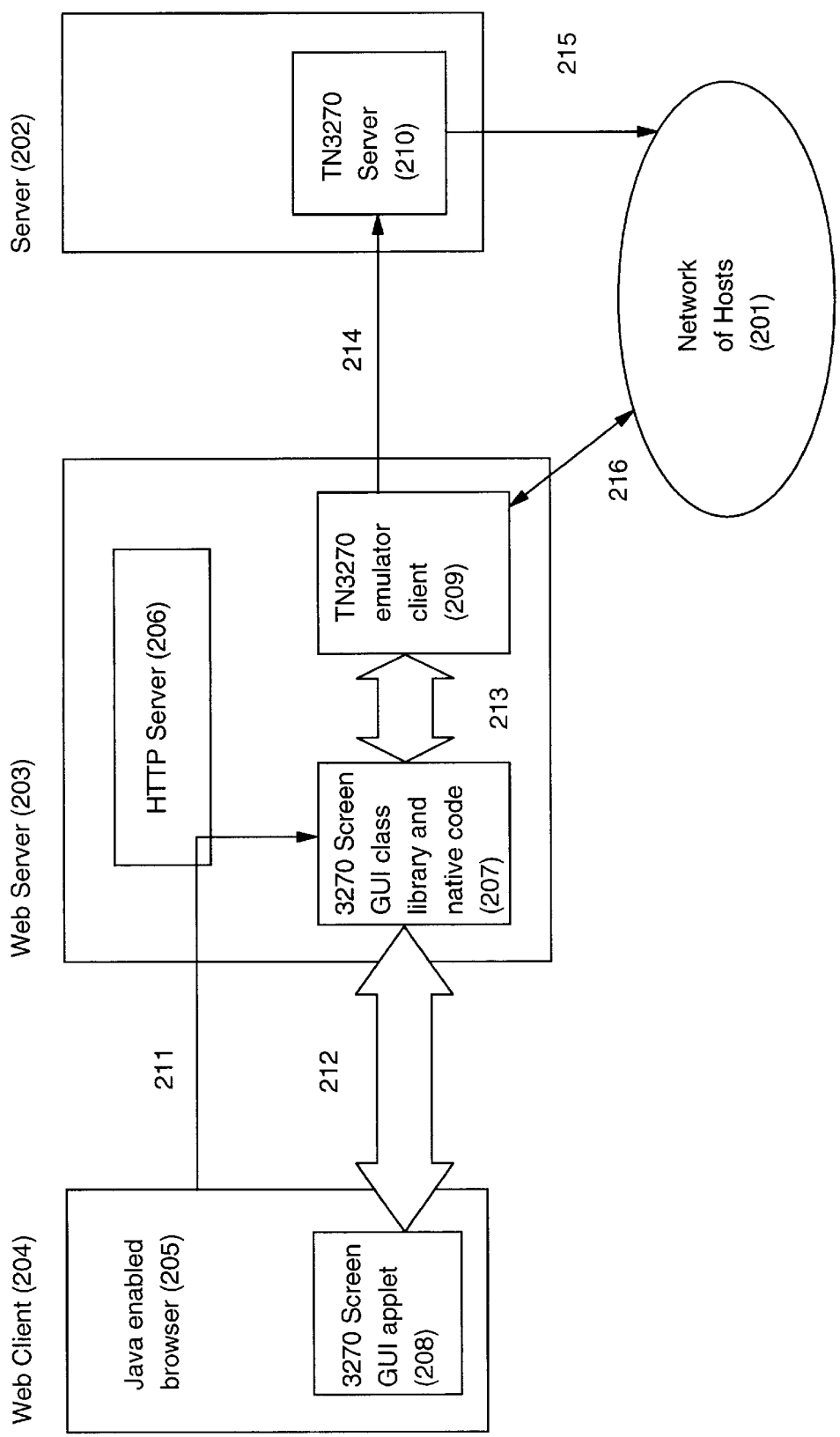
FIG. 2 depicts a network environment with server emulator and client Java GUI applets (Prior Art).

FIG. 2 demonstrates an initial step in attempting to solve those problems that still has shortcomings. In this scenario, a user at workstation 204 uses a Java enabled browser (205) to initiate downloading (211) of a 3270 screen GUI applet (208) from the GUI class library (207) physically residing on the Web server (203). Once downloaded, the applet communicates with the Web server (212), generally by proprietary means, to initiate a host connection. The class library (207) forwards this request (213) to the TN3270 client (209) through the use of an emulator programming interface such as EHLLAPI. Note that this step is synonymous to the user in FIG. 1 using the TN3270 emulator client to reach the host. Flows 214 and 215 demonstrate the connect request flowing from client 209, to TN3270 server 210, to the network of hosts 201 and the target host. Data is then transmitted from the target host back to the TN3270 client emulator 209 (such as logon screen text). This data flows back over the EHLLAPI interface (213) and the proprietary class library interface (212) to reach the 3270 screen GUI applet and ultimately the user. The user responds by logging on and a session is established between Web server 203 and the host, the output and input to which is handled via flows 212 and 213.

Figure 3:
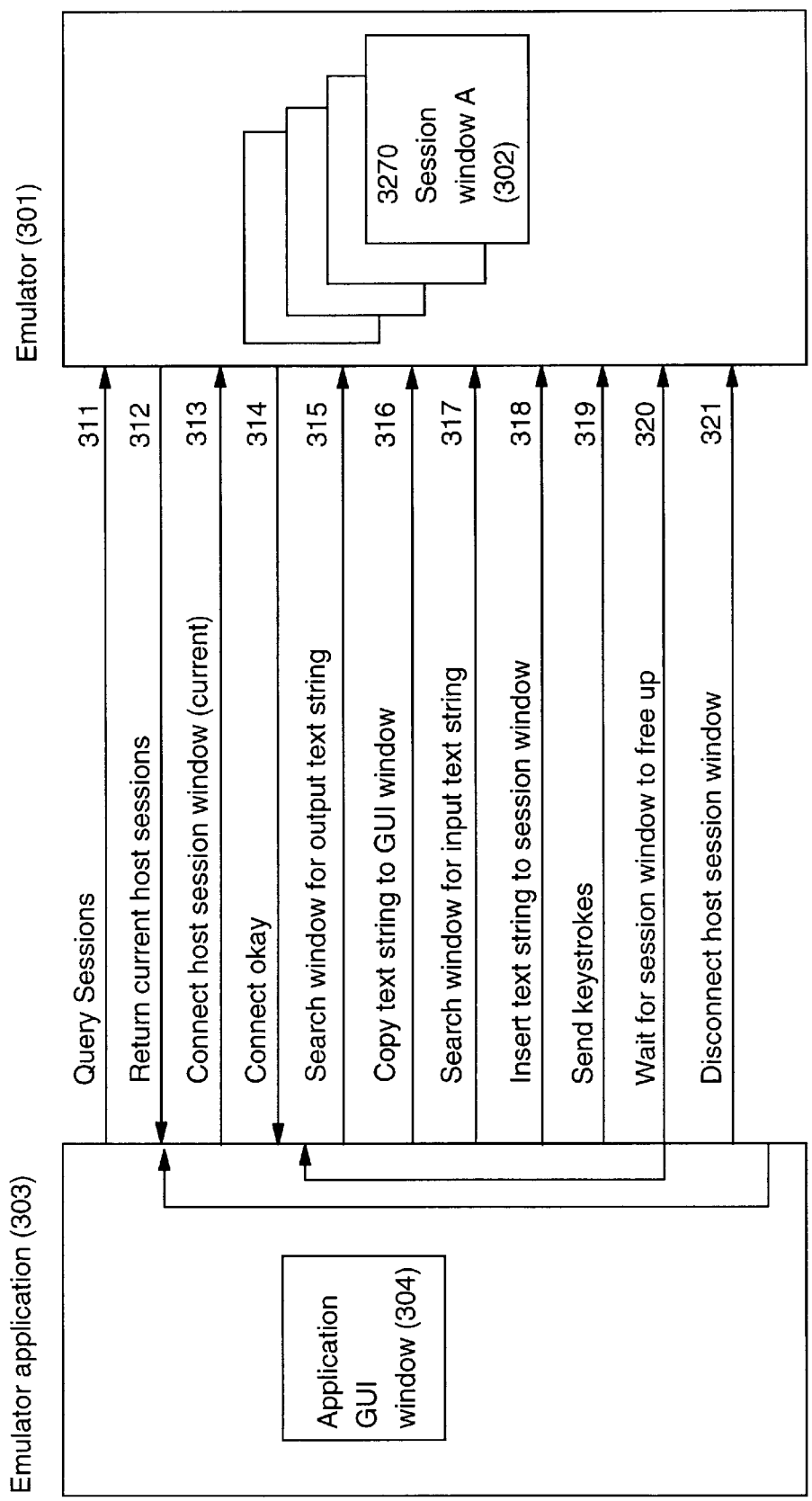
FIG. 3 depicts the typical flows of a screen scraping emulator application (Prior Art).

The web solution no longer has the session established with the user's machine (204). Instead the session is with the server (203) and proprietary interfaces must be used to get information to and from the user. In addition, the information being transferred to the user in this solution is always after the information has been displayed by the client (209). Any EHLLAPI applications a user might like to run on the web client (204) only have the option of screen scraping, rather than direct data-stream, interaction using this solution. FIG. 3 presents a more detailed look at the typical flows of a screen scraping EHLLAPI capability.

The example in FIG. 3 begins with an emulator operator starting the emulator (301) and initiating host sessions (302). Refer to FIGS. 1 and 2 for examples of where the emulator application and sessions actually exist; user's machine or server. The emulator application (303) that the user runs then queries the emulator for open sessions (311) and receives a response (312) indicating the current host sessions. Application 303 chooses the desired session and connects the host session to their application GUI window (304) (313), at which point the connection is confirmed (314) by the emulator. Once the session window is connected the emulator application (303) proceeds to receive host data and manipulate the data by using screen scraping techniques. The emulator application (303) can search for key output text strings (315) in a session window (302) that it wishes to display in a GUI window (304) and copy the string to the GUI window (316) if desired). The emulator application (303) can also search for key text strings (317) in a session window (302) that signal the location of an input field such as "USERNAME:" or "PASSWORD:". Once the input field is located in a session window (302), user input to a GUI window (304) can be copied into that location for transmission back to the host (318). In this way, a GUI window (304) is simply an extension of a session window (302). Because of this window extension approach, an emulator application (303) must send keystrokes (319) to the session window (302) and then wait for the window to free up for future interactions (320). Flows 315 through 320 present some of the basic functions that an emulator application (303) repeatedly uses to communicate with the host through a session window (302). When an emulator application (303) wishes to switch to another session window it requests to disconnect (321) from its current host session window. In this way, screen scraping applications must connect and disconnect to each session window they wish to manipulate. There is no capability for monitoring multiple sessions simultaneously by one emulator application. The emulator operator must then end the session.

Figure 4:
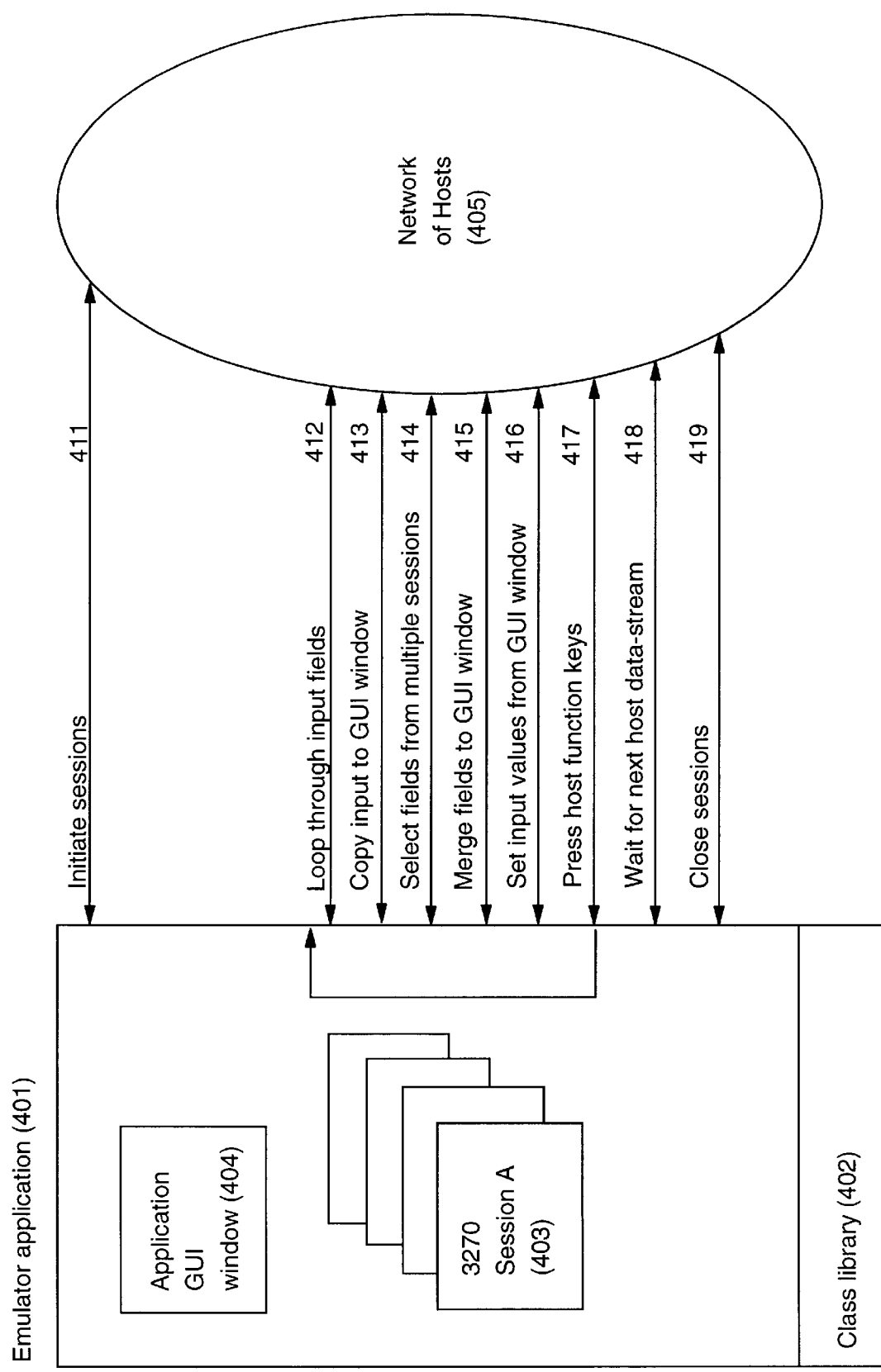
FIG. 4 depicts the flows of an access application for a host with direct data-stream access.

FIG. 4 presents the interactions possible with the present invention's approach allowing direct data-stream access. The emulator application (401) directly initiates (411) host sessions (403) without the need for an emulator operator to start emulator session windows. This direct control of the sessions also allows the emulator application (401) to manipulate multiple sessions at one time with no need to connect and disconnect from window sessions. All fields and attributes of the current host session are maintained in a data structure directly accessible by the emulator application without the need to search a window for fields. Thus, all input fields of a given data-stream are easy to search and display in the application GUI window (404). This can be done on a per-session basis as shown in 412 and 413, or the application can do multi-session searches and merge input fields in the GUI application window (404) as shown in 414 and 415. Once a user inputs to a GUI application window (404), the application can set host input fields and send the results to the host (416). This is also true for input unrelated to an input field, such as function keys (417). The present invention simplifies these interactions by removing the need to check for window status before each input. The present invention is constantly aware of session state and receives notification whenever a new data-stream is coming. Thus, it is simply a matter of waiting for notification (418) instead of looping to check the session state. Because of the capability for multiple concurrent session management, the emulator application (401) can completely close the session whenever it is done with it instead of relying on an emulator operator.

Figure 5:
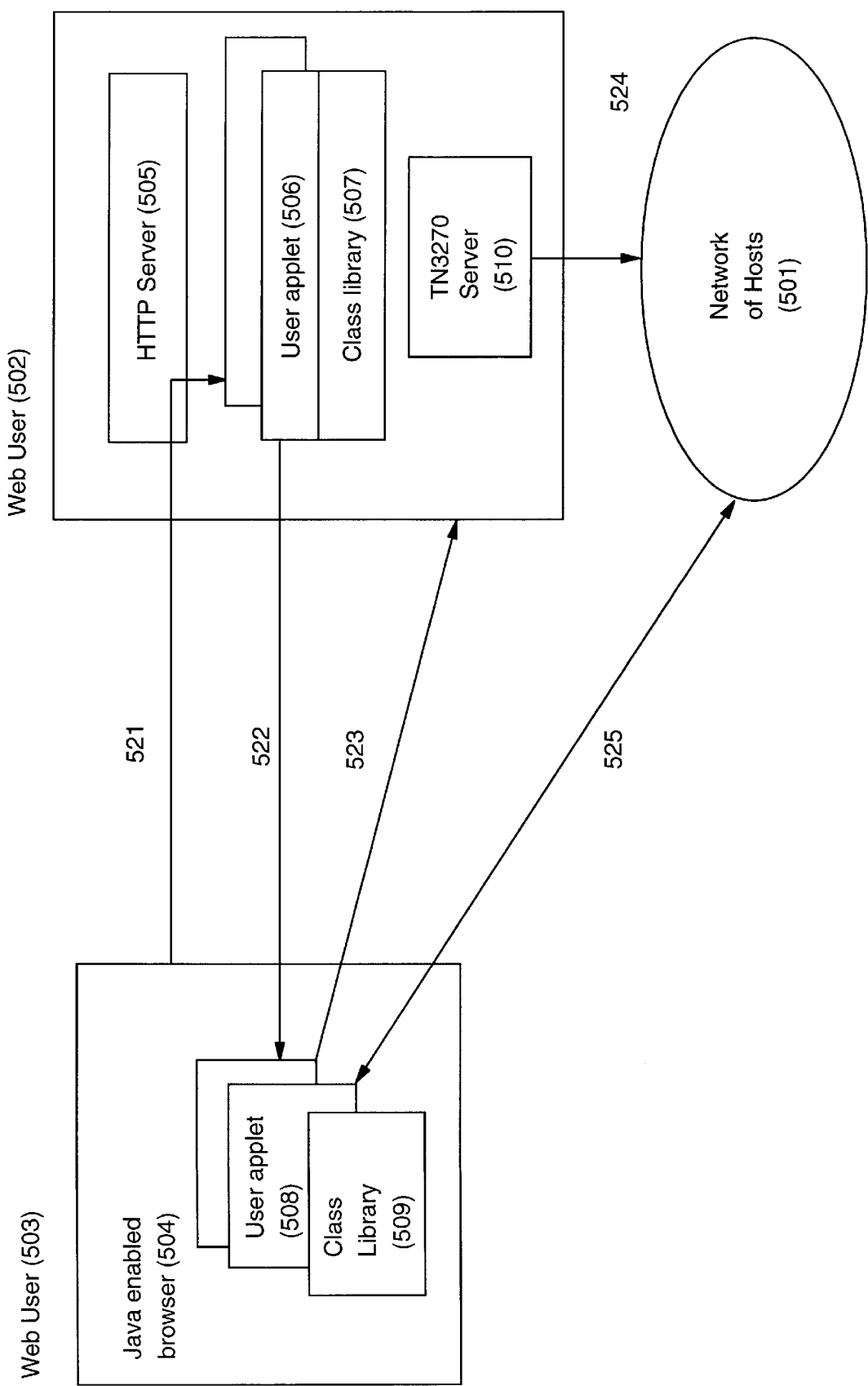
FIG. 5 depicts the network environment with client emulator applets as possible with the present invention.

To accomplish 411 through 419, the emulator application (401) runs on top of a platform independent class library (402) which is downloadable from a server in applet mode. The class methods can also be executed resident on the server in a server application mode. FIG. 5 presents a detailed look at how this class library is used in the Web client/server environment of the preferred embodiment.

The interaction in FIG. 5 starts with a user on a workstation (503) contacting a Web server (502) and its HTTP server software (505) via a Java-enabled browser (504). Both the previously-written user applet (506) and class library (507) physically reside on the server (502). By requesting a URL containing the applet reference (521) the user applet (506, 508) is downloaded on-the-fly (522) to run in the workstation's (503) memory and CPU. The user applet (508), through the use of class library methods (507, 509), connects to the TN3270 server (510) through standard interfaces (523). The TN3270 server (510) then contacts the target host found in the network of hosts (501) with the connection request (524). The host responds and a persistent end-to-end session is established between the user applet (508) and the target host (525). The user applet (508) then proceeds to interact with the target host using the class library (507) as described in FIG. 4.

Although the class library was downloaded to the workstation (503) in this example, applications can be written that execute on the server (502) and participate in client/server execution as defined by the applications developed.

The preferred embodiment captured in the Figures generally involves downloadable user applets but this is not meant to limit the invention in any way to a particular programming environment or emulation environment. The present invention can be used for client applications, server applications or in systems of interacting applications on clients and servers.

What is claimed is:

1. A method for enabling a user station to access a target host, said method comprising the steps of:

accessing a function residing on a web server;

requesting said function to instantiate a host access function on said user station;

accessing a host server by executing said instantiated host access function; and, establishing a single session between said target host and said user station.

2. A method as claimed in claim 1 wherein said user station communicates with said target host through said host access function.

3. A method as claimed in claim 1 or 2 wherein said host access function instantiated on said user station communicates with said target host using an interface independent of said web server function involved.

4. A method as claimed in claim 1 or 2 wherein said host access function is implemented as a Java applet.

5. A method as claimed in claim 1 or 2 wherein said target host communicates with said user station by way of data streams.

6. A method as claimed in claim 5 wherein said host access function parses said data streams into a presentation space.

7. A method as claimed in claim 6 wherein said presentation space is parsed into input fields, output fields and data blocks.

8. A method as claimed in claim 1 or 2 wherein said host access function is implemented as a dynamically downloadable application.

9. A method as claimed in claim 1 or 2 wherein said user station communicates with said target host by way of a terminal emulation window on said user station.

10. A method as claimed in claim 5 wherein said web server also executes a local host access function and interacts with said client function to send, receive or manipulate said data streams.

11. A method for enabling a user station to access a target host, said method comprising the steps of:
accessing a function residing on a web server;
requesting said function to instantiate a host access function on said user station;
accessing a host server by executing said instantiated host access function; and
establishing a session between said target host and said user station; wherein said target host communicates with said user station by way of data streams, said host access function parses said data streams into a presentation space, said presentation space is parsed into input fields, output fields and data blocks and wherein said input fields, output fields and data blocks are used by a user applicaton in sending and receiving formatted information for a user.

12. A computer system contained within a computer network, said computer network having computers connected together using telecommunications mechanisms wherein a user station accesses a target host, said access comprising:
means operatively associated with said user station for accessing a function residing on a web server;
means operatively associated with said user station for requesting said function to instantiate a host access function on said user station;
means operatively associated with said user station for accessing a host server by executing said instantiated host access function; and,
means operatively associated with said user station and said host server for establishing a single session between said target host and said user station.

13. A computer system as claimed in claim 12 wherein said user station communicates with said target host through said host access function.

14. A computer system as claimed in claim 12 or 13 wherein said host access function instantiated on said user station communicates with the host using an interface independent of said web server function involved.

15. A computer system as claimed in claim 12 or 13 wherein said function is implemented as a Java applet.

16. A computer system as claimed in claim 12 or 13 wherein said session established between said target host communicating with said user station carries data streams.

17. A computer system as claimed in claim 16 further comprising means within said host access function for parsing said data streams into a presentation space.

18. A computer system as claimed in claim 17 wherein said presentation space is parsed into input fields, output fields and data blocks.

19. A computer system as claimed in claim 12 or 13 wherein said function is implemented as a dynamically downloadable application.

20. A computer system as claimed in claim 12 or 13 wherein said user station communicates with said target host by way of a terminal emulation window on said user station.

21. A computer system as claimed in claim 16 further comprising means for said web server to execute a local host access function and interact with said client function to send, receive or manipulate said data streams.

22. A computer system contained within a computer network, said computer network having computers connected together using telecommunications mechanisms wherein a user station accesses a target host, said access comprising:
means operatively associated with said user station for accessing a function residing on a web server;
means operatively associated with said user station for requesting said function to instantiate a host access function on said user station;
means operatively associated with said user station for accessing a host server by executing said instantiated host access function;
means operatively associated with said user station and said host server for establishing a session between said target host and said user station; wherein said session established between said target host communicating with said user station carries data streams;
means within said host access function for parsing said data streams into a presentation space wherein said presentation space is parsed into input fields, output fields and data blocks; and,
means for and utilizing said input fields output fields and data blocks, by a user application, in sending and receiving formatted information for a user.

23. A computer program product residing on a computer-readable media for a user station to access a target host, said access comprising:
computer readable program code means operatively associated with said user station for accessing a function residing on a web server;
computer readable program code means operatively associated with said user station for requesting said function to instantiate a host access function on said user station;
computer readable program code means operatively associated with said user station for accessing a host server by executing said instantiated host acces function; and,
computer readable program code means operatively associated with said user station and said host server for establishing a single session between said target host and said user station.

24. A computer program product as claimed in claim 23 wherein said user station communicates with said target host through said host access function.

25. A computer program product as claimed in claim 23 or 24 wherein said host access function instantiated on said user station communicates with the host using an interface independent of said web server function involved.

26. A computer program product as claimed in claim 23 or 24 wherein said function is implemented as a Java applet.

27. A computer program product as claimed in claim 23 or 24 wherein said target host communicates with said user station by way of data streams.

28. A computer program product as claimed in claim 27 wherein said host access function parses said data streams into a presentation space.

29. A computer program product as claimed in claim 28 wherein said presentation space is parsed into input fields, output fields and data blocks.

30. A computer program product as claimed in claim 23 or 24 wherein said function is implemented as a dynamically downloadable application.

31. A computer program product as claimed in claim 23 or 24 wherein said user station communicates with said target host by way of a terminal emulation window on said user station.

32. A computer program product as claimed in claim 27 wherein said web server also executes a local host access function and interacts with said client function to send, receive or manipulate said data streams.

33. A computer program product residing on a computer-readable media for a user station to access a target host, said access comprising:

computer readable program code means operatively associated with said user station for accessing a function residing on a web server;

computer readable program code means operatively associated with said user station for requesting said function to instantiate a host access function on said user station;

computer readable program code means operatively associated with said user station for accessing a host server by executing said instantiated host access function; and, computer readable program code means operatively associated with said user station and said host server for establishing a session between said target host and said user station wherein said target host communicates with said user station by way of data streams, said host access function parses said data streams into a presentation space, said presentation space is parsed into input fields, ouput fields, and data blocks and said input fields, output fields and data blocks are used by a user application in sending and receiving formatted information for a user.

34. A method for enabling a user station to access a target host, said method comprising the steps of:

accessing a function residing on a web server;

requesting said function to instantiate a host access function on said user station;

accessing a host server by executing said instantiated host access function; and establishing a session between said target host and said user station; wherein said user station communicates with said target host through said host access function and said target host communicates with said user station by way of data streams, said host access function parses said data streams into a presentation space, said presentation space parsed into input fields, output fields and data blocks and wherein said input fields, output fields and data blocks are used by a user application in sending and receiving formatted informatoin for a user.

35. A computer system contained within a computer network, said computer network having computers connected together using telecommunications mechanisms wherein a user station accesses a target host, said access comprising:

means operatively associated with said user station for accessing a function residing on a web server;

means operatively associated with said user station for requesting said function to instantiate a host access function on said user station;

means operatively associated with said user station for accessing a host server by executing said instantiated host access function;

means operatively associated with said user station and said host server for establishing a session between said target host and said user station; wherein said user station communicates with said target host through said host access function and said session established between said target host communicating with said user station carries data streams;

means within said host access function for parsing said data streams into a presentation space wherein said presentation space is parsed into input fields, output fields and data blocks; and, means for and utilizing said input fields output fields and data blocks, by a user application, In sending and receiving formatted information for a user.

36. A computer program product residing on a computer-readable media for a user station to access a target host, said access comprising:

computer readable program code means operatively associated with said user station for accessing a function residing on a web server;

computer readable program code means operatively associated with said user station for requesting said function to instantiate a host access function on said user station;

computer readable program code means operatively associated with said user station for accessing a host server by executing said instantiated host access function; and, computer readable program code means operatively associated with said user station and said host server for establishing a session between said target host and said user station wherein said user station communicates with said target host through said host access function, said target host communicates with said user station by way of data streams, said host access function parses said data streams into a presentation space, said presentation space is parsed into input fields, output fields, and data blocks and said input fields, output fields and data blocks are used by a user application in sending and receiving formatted information for a user.

* * * * *